United States Patent
Tse

(10) Patent No.: US 10,719,232 B2
(45) Date of Patent: Jul. 21, 2020

(54) PROVIDING VIRTUAL BUTTONS IN A HANDHELD DEVICE

(71) Applicant: QUALCOMM Incorporated, San Diego, CA (US)

(72) Inventor: Justin Tse, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 15/177,151

(22) Filed: Jun. 8, 2016

(65) Prior Publication Data

US 2017/0357440 A1   Dec. 14, 2017

(51) Int. Cl.
| | |
|---|---|
| *G06F 3/0488* | (2013.01) |
| *G06F 1/16* | (2006.01) |
| *G06F 3/01* | (2006.01) |
| *G06F 3/0346* | (2013.01) |
| *G06F 3/041* | (2006.01) |
| *G06F 3/0482* | (2013.01) |
| *G06F 3/0484* | (2013.01) |
| *G06K 9/00* | (2006.01) |

(52) U.S. Cl.
CPC ........ *G06F 3/04886* (2013.01); *G06F 1/1626* (2013.01); *G06F 3/016* (2013.01); *G06F 3/0346* (2013.01); *G06F 3/0414* (2013.01); *G06F 3/0482* (2013.01); *G06F 3/0488* (2013.01); *G06F 3/04845* (2013.01); *G06K 9/0002* (2013.01); *G06F 2203/04104* (2013.01)

(58) Field of Classification Search
USPC ......................................................... 345/173
See application file for complete search history.

(56) References Cited

U.S. PATENT DOCUMENTS

| | | | | |
|---|---|---|---|---|
| 9,984,271 | B1* | 5/2018 | King | G06K 9/0002 |
| 2002/0178264 | A1* | 11/2002 | Benda | G06F 9/5072 |
| | | | | 709/227 |
| 2008/0004904 | A1* | 1/2008 | Tran | A61B 5/0006 |
| | | | | 705/2 |
| 2010/0085317 | A1* | 4/2010 | Park | G06F 3/016 |
| | | | | 345/173 |
| 2010/0134424 | A1* | 6/2010 | Brisebois | G06F 3/03547 |
| | | | | 345/173 |

(Continued)

FOREIGN PATENT DOCUMENTS

| | | |
|---|---|---|
| EP | 2175344 A2 | 4/2010 |
| KR | 20130137969 A | 12/2013 |

OTHER PUBLICATIONS

International Search Report and Written Opinion—PCT/US2017/027201—ISA/EPO—dated Jul. 12, 2017.

*Primary Examiner* — Chineyere D Wills-Burns
(74) *Attorney, Agent, or Firm* — Paradice and Li LLP/QUALCOMM Incorporated

(57) ABSTRACT

Embodiments of apparatus, computer program product, and method for providing virtual buttons are disclosed. In one embodiment, a method of providing virtual buttons in a device includes detecting a grip around a perimeter of the device, where the perimeter of the device includes one or more ultrasonic sensors; determining one or more locations of one or more fingers of a user using data collected by the one or more ultrasonic sensors; and providing one or more virtual buttons around the perimeter of the device based on the one or more locations of the one or more fingers of the user.

29 Claims, 15 Drawing Sheets

(56) References Cited

U.S. PATENT DOCUMENTS

| | | | |
|---|---|---|---|
| 2011/0248838 A1* | 10/2011 | Krahenbuhl | G06F 1/1626 340/407.2 |
| 2012/0032979 A1* | 2/2012 | Blow | G06F 1/1626 345/647 |
| 2012/0235790 A1 | 9/2012 | Zhao et al. | |
| 2013/0076639 A1 | 3/2013 | Brisebois et al. | |
| 2013/0265235 A1* | 10/2013 | Cai | G06F 3/0488 345/169 |
| 2013/0300668 A1* | 11/2013 | Churikov | G06F 3/041 345/168 |
| 2014/0003683 A1* | 1/2014 | Vieta | G06K 9/3208 382/124 |
| 2014/0115695 A1 | 4/2014 | Fadell et al. | |
| 2014/0247210 A1* | 9/2014 | Henderek | G06F 3/041 345/156 |
| 2014/0247221 A1* | 9/2014 | Ferren | H04N 5/232 345/168 |
| 2014/0289642 A1 | 9/2014 | Prasad | |
| 2014/0289668 A1* | 9/2014 | Mavrody | G06F 3/04886 715/781 |
| 2014/0351768 A1* | 11/2014 | Park | G06F 3/0488 715/856 |
| 2015/0007069 A1 | 1/2015 | Huang | |
| 2015/0153889 A1 | 6/2015 | Vanblon et al. | |
| 2015/0205400 A1* | 7/2015 | Hwang | G06F 3/0488 345/654 |
| 2015/0213245 A1 | 7/2015 | Tartz et al. | |
| 2017/0053151 A1* | 2/2017 | Yeke Yazandoost | A61B 8/00 |
| 2017/0285834 A1* | 10/2017 | Chin | G06F 3/0416 |
| 2018/0343023 A1* | 11/2018 | Park | H04M 1/72519 |

\* cited by examiner

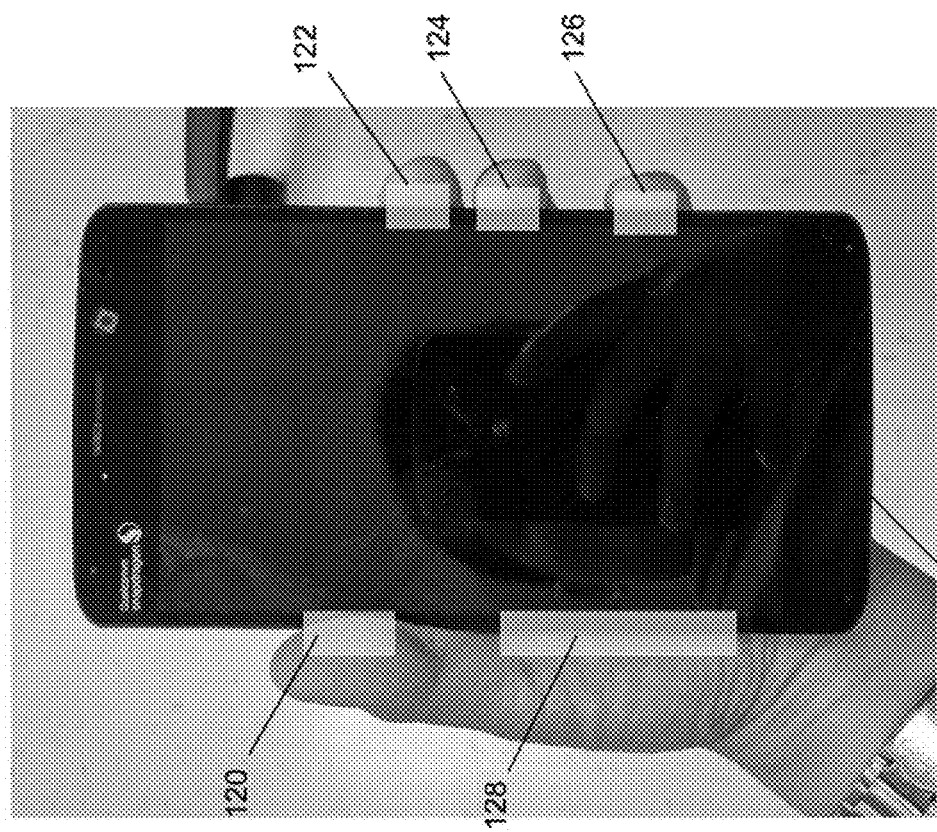
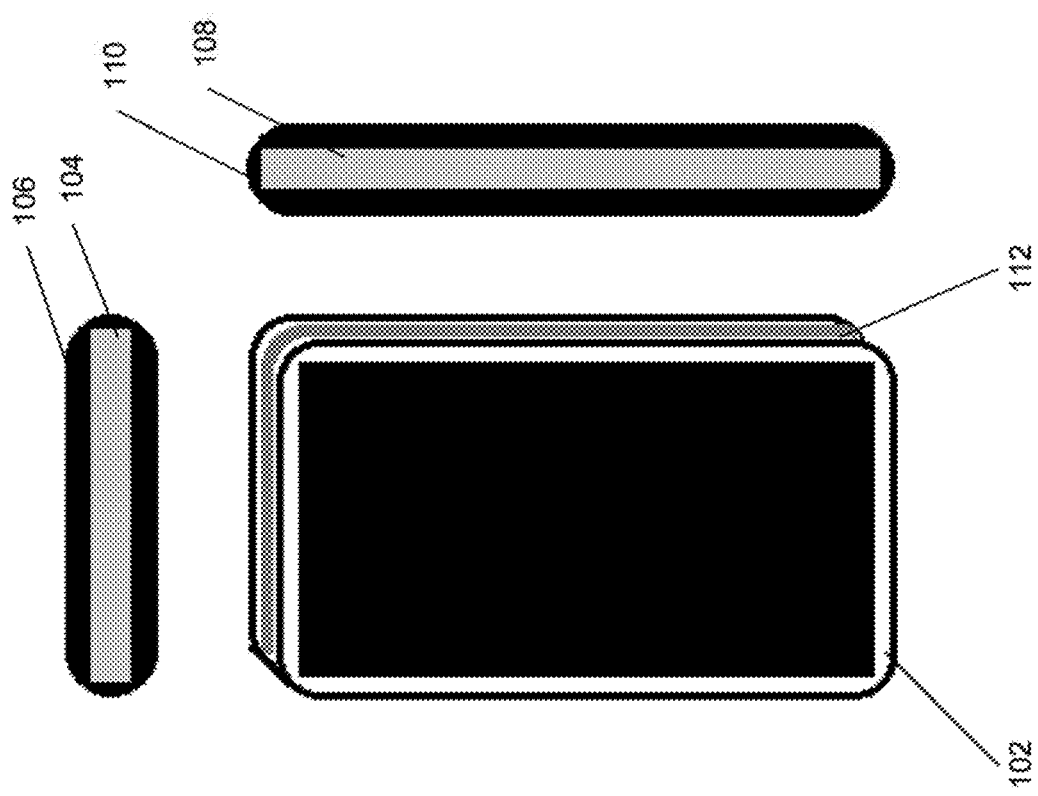

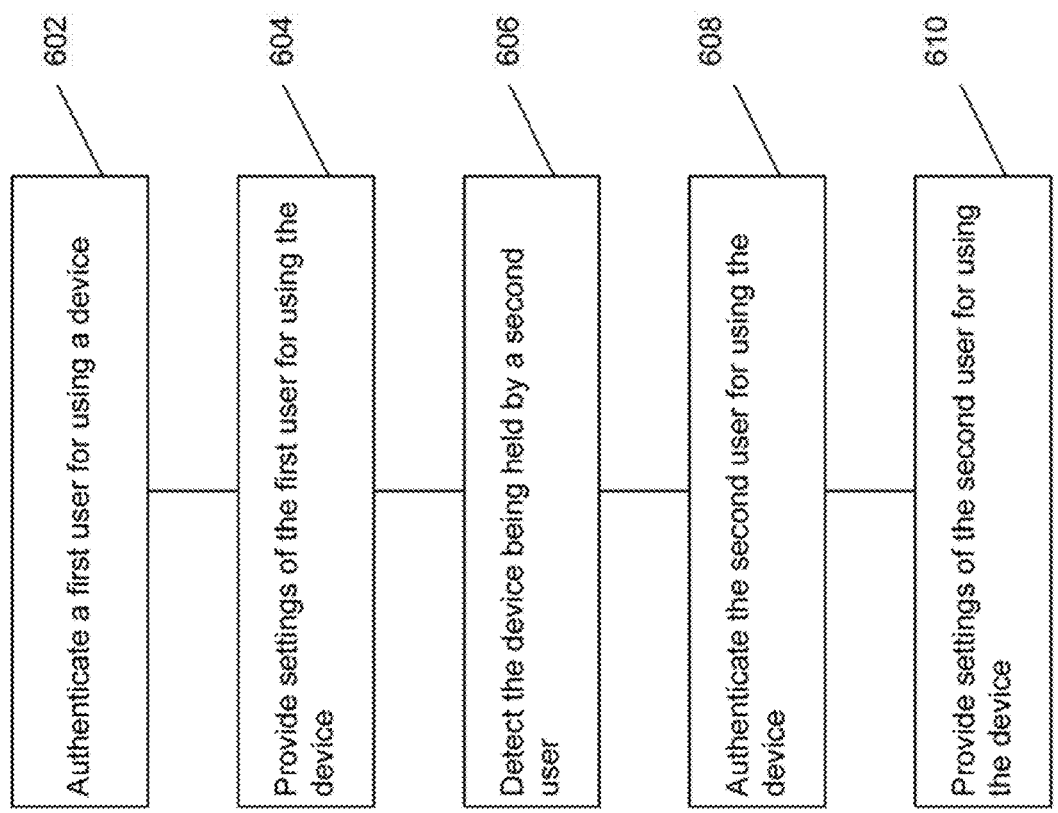

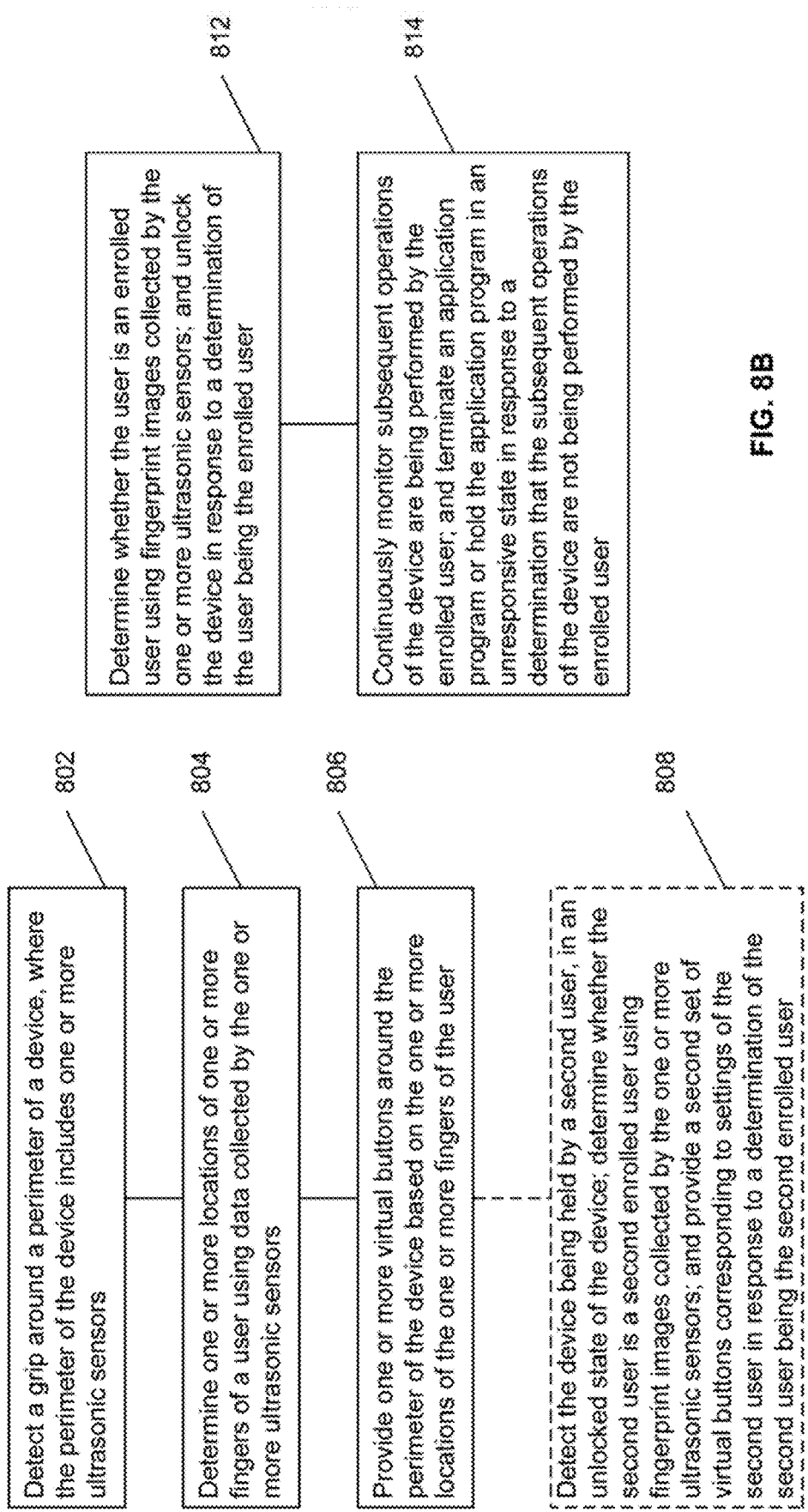

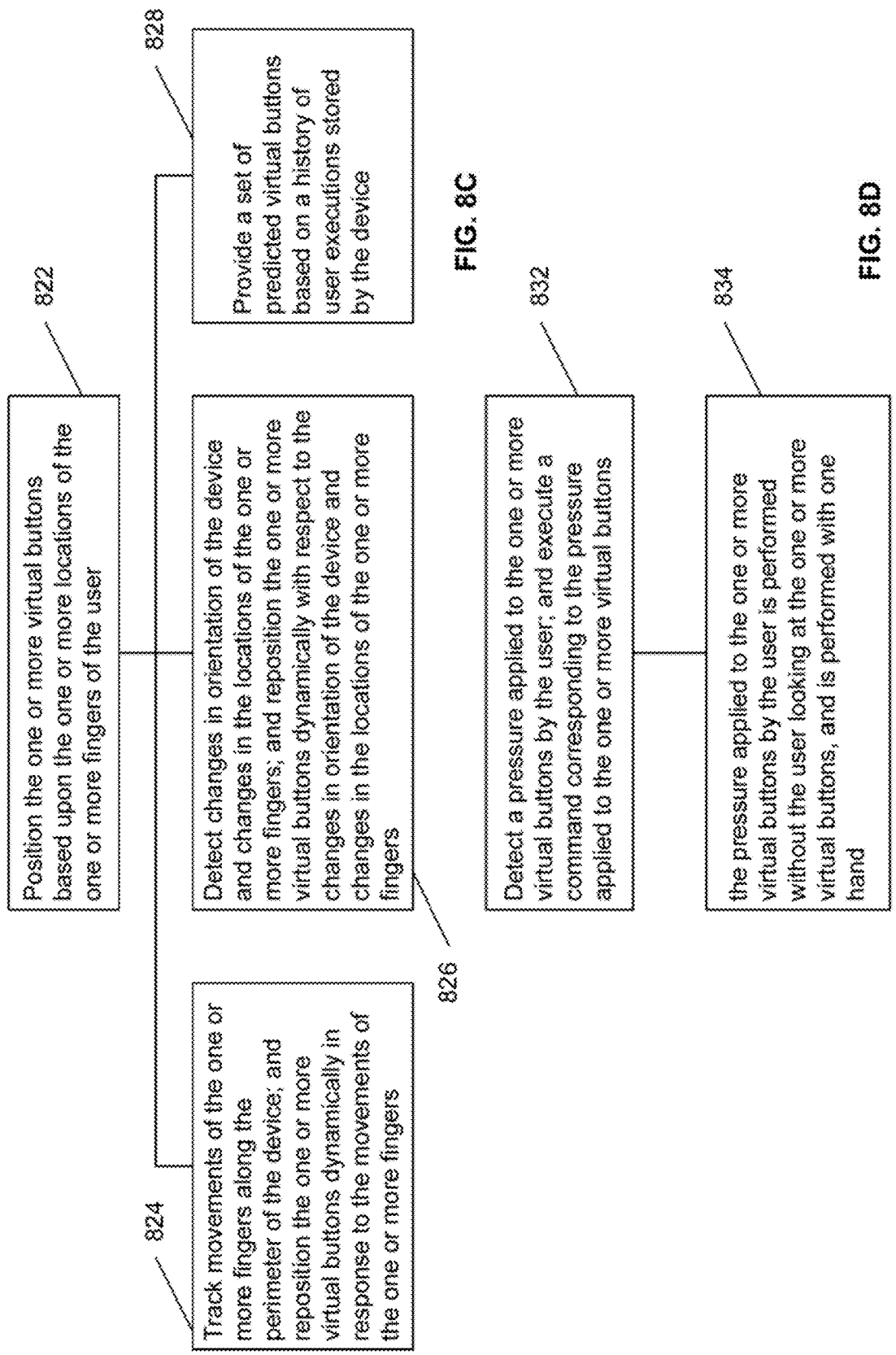

PROVIDING VIRTUAL BUTTONS IN A HANDHELD DEVICE

FIELD

The present disclosure relates to the field of user interface. In particular, the present disclosure relates to apparatus, computer program product, and method for providing virtual buttons in a handheld device.

BACKGROUND

In conventional handheld devices, a user may customize the user interface of a home page or other pages of the device based on the user's preferences or use the default setting provided by the manufacturer. After the user has customized the home page or other pages, the locations of buttons/icons are fixed until the user makes further modifications. One of the drawbacks of this type of user interface is that the buttons/icons are stationary despite the user's hand operating the device may move around to different positions to hold the device. This drawback can cause some of the buttons not reachable by the hand holding the device without changing the grip of the device. In addition, the conventional user interface would require the user to look at the display to locate the buttons to be pressed, and in many cases the conventional user interface would require two hands to operate the device, for example using the assistance of the hand that is not holding the device to reach certain buttons. Thus, it would be beneficial to provide virtual buttons in a handheld device based on the locations of the user's fingers. It would also be beneficial to enable the user to generate commands according to the user's preferences using only one hand and without looking at the display of the device.

SUMMARY

Embodiments of apparatus, computer program product, and method for providing virtual buttons in a handheld device are disclosed. In one embodiment, a method of providing virtual buttons in a device includes detecting a grip around a perimeter of the device, where the perimeter of the device includes one or more ultrasonic sensors, determining one or more locations of one or more fingers of a user using data collected by the one or more ultrasonic sensors, and providing one or more virtual buttons around the perimeter of the device based on the one or more locations of the one or more fingers of the user.

According to aspects of the present disclosure, the method of detecting the grip around the perimeter of the device includes determining whether the user is an enrolled user using fingerprint images collected by the one or more ultrasonic sensors, and unlocking the device in response to a determination of the user being the enrolled user. The method further includes continuously monitoring subsequent operations of the device are being performed by the enrolled user, and terminating an application program or hold the application program in an unresponsive state in response to a determination that the subsequent operations of the device are not being performed by the enrolled user.

In some exemplary implementations, the method of determining the one or more locations of the one or more fingers of the user includes determining a thumb location of the user, determining an index finger location of the user, determining a long finger location of the user, determining a ring finger location of the user, determining a little finger location of the user, or some combination thereof.

In some exemplary implementations, the method of providing the one or more virtual buttons includes positioning the one or more virtual buttons based upon the one or more locations of the one or more fingers of the user. The method of providing the one or more virtual buttons may further include tracking movements of the one or more fingers along the perimeter of the device, and repositioning the one or more virtual buttons dynamically in response to the movements of the one or more fingers. The method of providing the one or more virtual buttons may further include detecting changes in orientation of the device and changes in the locations of the one or more fingers, and repositioning the one or more virtual buttons dynamically with respect to the changes in orientation of the device and changes in the locations of the one or more fingers. The method of providing the one or more virtual buttons may further include providing a set of predicted virtual buttons based on a history of user executions stored by the device.

In some exemplary implementations, the method may include indicating positions of the one or more virtual buttons to the user through corresponding one or more haptic feedbacks, and acknowledging selections of the one or more virtual buttons to the user through the corresponding one or more haptic feedbacks. The method may further include detecting a pressure applied to the one or more virtual buttons by the user, and executing a command corresponding to the pressure applied to the one or more virtual buttons. Note that the command corresponding to the pressure applied to the one or more virtual buttons by the user is dependent upon a determination of which finger is applying the pressure.

In some exemplary implementations, the method may further include detecting the device being held by a second user, in an unlocked state of the device, determining whether the second user is a second enrolled user using fingerprint images collected by the one or more ultrasonic sensors, and providing a second set of virtual buttons corresponding to settings of the second user in response to a determination of the second user being the second enrolled user.

In another embodiment, a device configured to provide virtual buttons includes one or more ultrasonic sensors configured to detect a grip around a perimeter of the device, and one or more processors. The one or more processors are configured to determine one or more locations of one or more fingers of a user using data collected by the one or more ultrasonic sensors, and provide one or more virtual buttons around the perimeter of the device based on the one or more locations of the one or more fingers of the user.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings.

FIGS. 1A-1B illustrate a handheld device configured to provide virtual buttons according to aspects of the present disclosure.

FIGS. 6A-6C illustrate methods of transiting of user accounts and providing virtual buttons according to aspects of the present disclosure.

FIGS. 8A-8D illustrate methods of providing virtual buttons in a handheld device according to aspects of the present disclosure.

DESCRIPTION OF EMBODIMENTS

Figure 2:
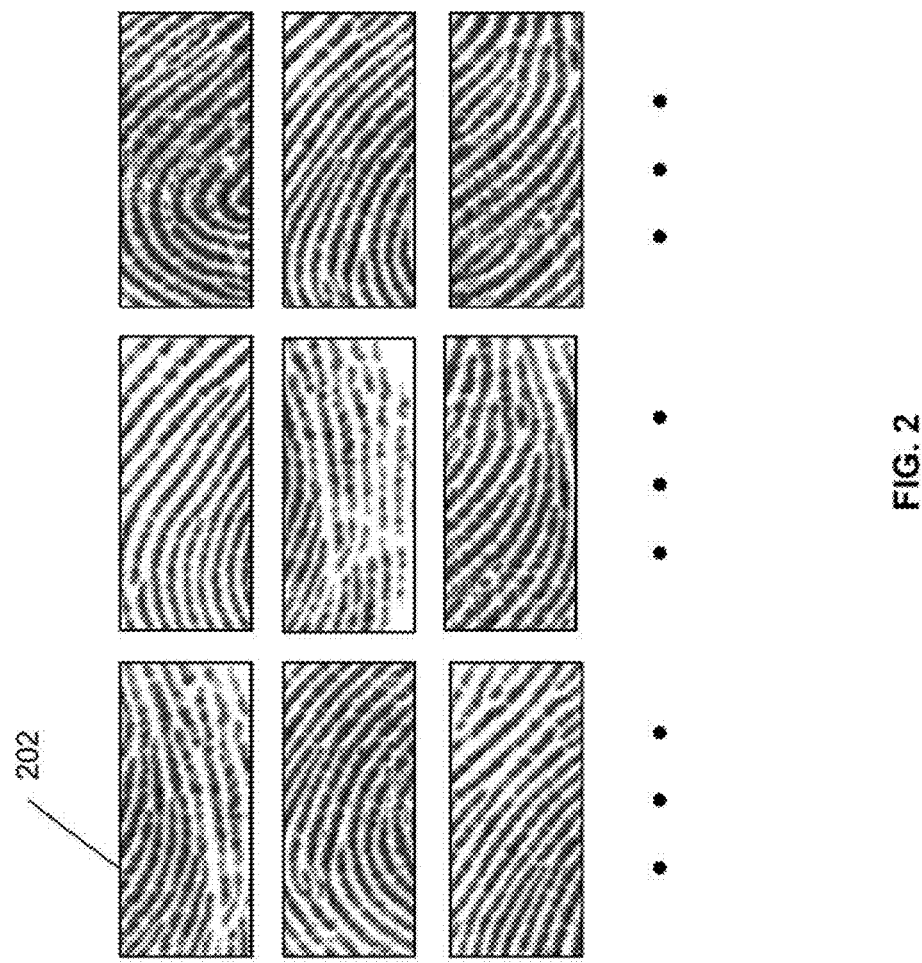
FIG. 2 illustrates sections of fingerprint images stored as templates in a template repository according to aspects of the present disclosure.

Embodiments of providing virtual buttons in a handheld device are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

FIG. 1A and FIG. 1B illustrate a handheld device configured to provide virtual buttons according to aspects of the present disclosure. In the following descriptions, a handheld device may also be referred to as a mobile device or a device. As shown in FIG. 1A, fingerprint sensors may be placed around one or more edges of a handheld device 102. For example, sensors 104 may be placed along a top edge 106 of the handheld device 102; sensors 108 may be placed along a side edge 110 of the handheld device. In other implementations, sensors 112 may be wrapped around the perimeter of the handheld device 102. Sensors 104, 108, or 112 can be capacitive, ultrasonic, or other sensor types that can be used to detect fingerprints of a user.

According to aspects of the present disclosure, ultrasonic sensors can be configured to produce high-resolution fingerprint images for user verification and authentication. In some implementations, ultrasonic fingerprint sensors can be configured to detect reflected signals proportional to the differential acoustic impedance between an outer surface of a platen and a finger ridge (tissue) and valley (air). For example, a portion of the ultrasonic wave energy of an ultrasonic wave may be transmitted from the sensor into finger tissue in the ridge areas while the remaining portion of the ultrasonic wave energy is reflected back towards the sensor, whereas a smaller portion of the wave may be transmitted into the air in the valley regions of the finger while the remaining portion of the ultrasonic wave energy is reflected back to the sensor.

Referring to FIG. 1B, sensors placed along the edges or perimeter of the handheld device 102 can be configured to detect and determine the locations of one or more fingers of a user. In some implementations, the locations of one or more fingers of the user may include the location of the thumb, the index finger, the long finger, the ring finger, the little finger, or some combination thereof. In some embodiments, the palm of the user sensors placed along the edges or perimeter of the handheld device 102 can be configured to detect and determine a portion of a palm of the user. In the example shown in FIG. 1B, fingerprints, represented by areas 120, 122, 124, and 126 of the user may be captured and their respective locations can be determined. Similarly, a portion of a palm print, represented by area 128, of the user may be captured and its respective location can be determined.

In some embodiments, ultrasonic sensors may be employed to detect fingerprints 120, 122, 124, 126, and palm print 128. According to aspects of the present disclosure, an ultrasonic sensor may include an ultrasonic transmitter and an ultrasonic receiver under a platen. The ultrasonic transmitter may be a piezoelectric transmitter that can generate ultrasonic waves. The ultrasonic receiver may include a piezoelectric material and an array of pixel circuits disposed on a substrate. In operation, the ultrasonic transmitter generates one or more ultrasonic waves that travel through the ultrasonic receiver to the exposed surface of the platen. At the exposed surface of the platen, the ultrasonic energy may be transmitted, absorbed or scattered by an object that is in contact with the platen, such as the skin of a fingerprint ridge, or reflected back. In those locations where air contacts the exposed surface of the platen, e.g., valleys between fingerprint ridges, most of the ultrasonic wave will be reflected back toward the ultrasonic receiver for detection. Control electronics may be coupled to the ultrasonic transmitter and ultrasonic receiver and may supply timing signals that cause the ultrasonic transmitter to generate one or more ultrasonic waves. The control electronics may then receive signals from the ultrasonic receiver that are indicative of reflected ultrasonic energy. The control electronics may use output signals received from the ultrasonic receiver to construct a digital image of the object. In some implementations, the control electronics may also, over time, successively sample the output signals to detect the presence and/or movement of the object.

According to aspects of the present disclosure, an ultrasonic sensor may include an ultrasonic transmitter and an ultrasonic receiver under a platen. The ultrasonic transmitter may be a plane wave generator including a substantially planar piezoelectric transmitter layer. Ultrasonic waves may be generated by applying a voltage to the piezoelectric layer to expand or contract the layer, depending upon the signal applied, thereby generating a plane wave. The voltage may be applied to the piezoelectric transmitter layer via a first transmitter electrode and a second transmitter electrode. In this fashion, an ultrasonic wave may be made by changing the thickness of the layer via a piezoelectric effect. This ultrasonic wave travels toward a finger (or other object to be detected), passing through the platen. A portion of the wave not absorbed or transmitted by the object to be detected may be reflected so as to pass back through the platen and be received by the ultrasonic receiver. The first and second transmitter electrodes may be metallized electrodes, for example, metal layers that coat opposing sides of the piezoelectric transmitter layer.

The ultrasonic receiver may include an array of pixel circuits disposed on a substrate, which also may be referred to as a backplane, and a piezoelectric receiver layer. In some implementations, each pixel circuit may include one or more TFT elements, electrical interconnect traces and, in some implementations, one or more additional circuit elements such as diodes, capacitors, and the like. Each pixel circuit may be configured to convert an electric charge generated in the piezoelectric receiver layer proximate to the pixel circuit into an electrical signal. Each pixel circuit may include a pixel input electrode that electrically couples the piezoelectric receiver layer to the pixel circuit.

In a particular implementation, a receiver bias electrode can be disposed on a side of the piezoelectric receiver layer proximal to platen. The receiver bias electrode may be a metallized electrode and may be grounded or biased to control which signals are passed to the TFT array. Ultrasonic energy that is reflected from the exposed (top) surface of the platen can be converted into localized electrical charges by the piezoelectric receiver layer. These localized charges are collected by the pixel input electrodes and are passed on to the underlying pixel circuits. The charges may be amplified by the pixel circuits and provided to the control electronics, which processes the output signals. Control electronics may be electrically connected to the first transmitter electrode and the second transmitter electrode, as well as to the receiver bias electrode and the pixel circuits on the substrate.

FIG. 2 illustrates sections of fingerprint images stored as templates in a template repository according to aspects of the present disclosure. In the following sections, for simplicity of expression, references to fingerprint image(s) may include fingerprint image(s) and/or palm print image(s); and palm print image(s) can be processed in a similar manner as fingerprint image(s). As shown in FIG. 2, a set of fingerprint images correspond to a plurality of fingerprint images of a user collected in a template repository. In some implementations, each image 202 in the set of fingerprint images may represent a section of a single finger of the user. In some other implementations, the set of fingerprint images may represent sections of images collected from multiple fingers of the user. In the example shown in FIG. 2, an image capture window 202 may be used to capture a portion of a user's fingerprint. In some implementations, the image capture window may have a dimension of 9 mm×4 mm (millimeters). In other implementations, the image capture window 104 may have a dimension of 15 mm×6 mm.

In some implementations, a set of templates that correspond to the set of fingerprint images are stored in the template repository or database. According to aspect of the present disclosure, a template may include at least one of: 1) descriptions of feature keypoints; 2) minutiae template; 3) pattern matching template; or any combination thereof. For example, a set of fingerprint images correspond to a plurality of fingerprint images of a user collected in the template repository. In some implementations, each image in the set of fingerprint images may represent a section of a single finger of the user. In some other implementations, the set of fingerprint images may represent sections of images collected from multiple fingers from the user. Note that rejected fingerprint images or the templates of the rejected fingerprint images may not be added to the template repository. For example, a fingerprint image may be rejected due to insufficient number of feature keypoints in this fingerprint image. A fingerprint image may also be rejected because it may be a sufficiently overlapped image with respect to the set of fingerprint images of the user in the template repository.

Figure 3:
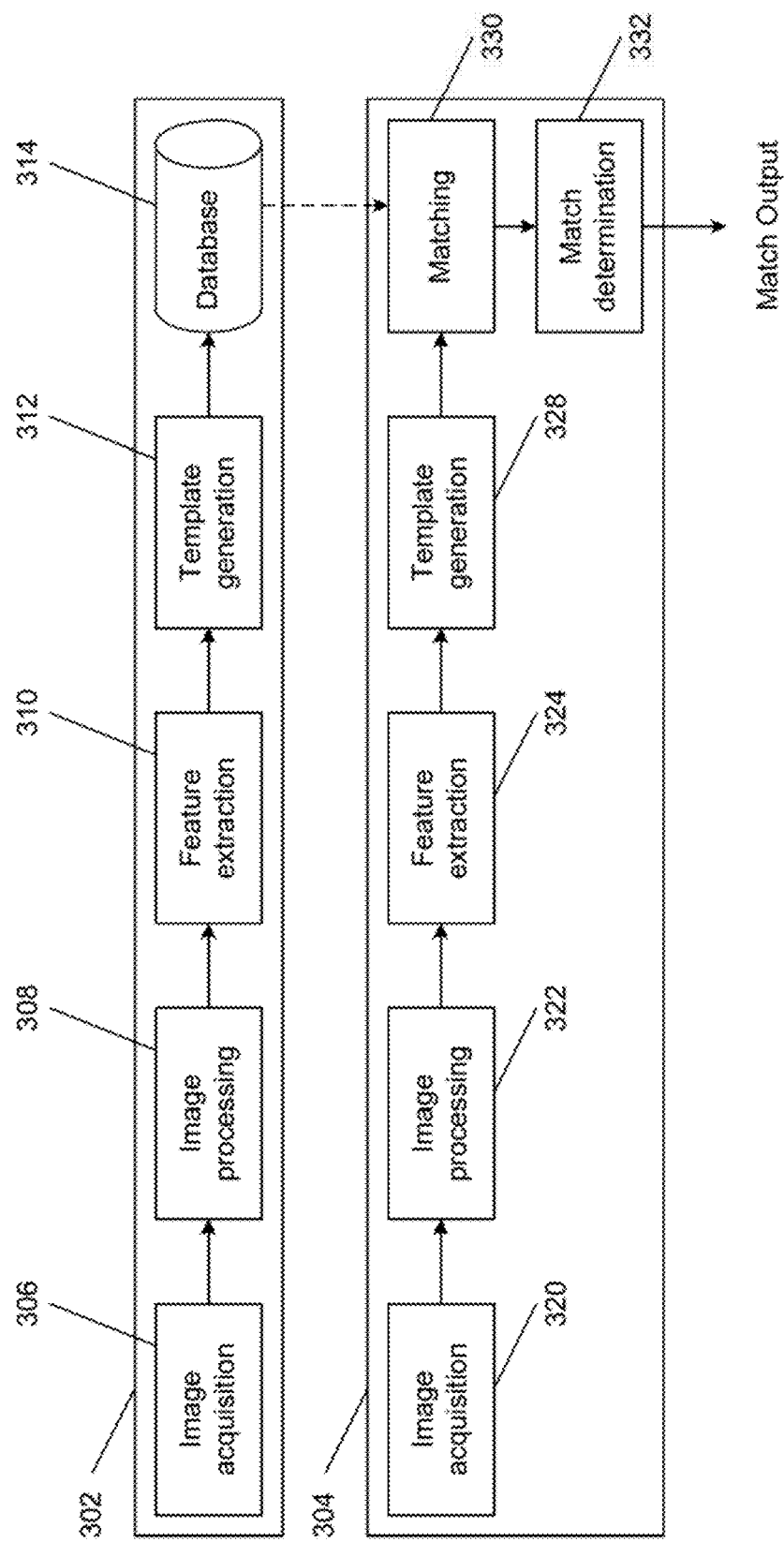
FIG. 3 illustrates method of enrollment and/or authentication of fingerprints of a user according to aspects of the present disclosure.

FIG. 3 illustrates method of enrollment and/or authentication of fingerprints of a user according to aspects of the present disclosure.

In this example, block 302 describes the enrollment process and block 304 describes the verification/authentication process. During enrollment, an acquired image may be processed to generate a template (e.g. template information, template data, biometric reference data, or reference) that can be stored in a local or external database. Note that a reference may include one or more templates, models, or raw images. In some implementations, the enrollment process may include image acquisition 306, image processing 308, feature extraction 310, template generation 312, and data storage in a database 314. The verification/authentication may include image acquisition 320, image processing 322, feature extraction 324, template generation 328, fingerprint matching 330 using information stored in the database 314, and match determination 332 to determine and provide a match output. In the verification/authentication stage, each acquired image may be processed to generate a template; the generated templates may be used for matching.

Figure 4:
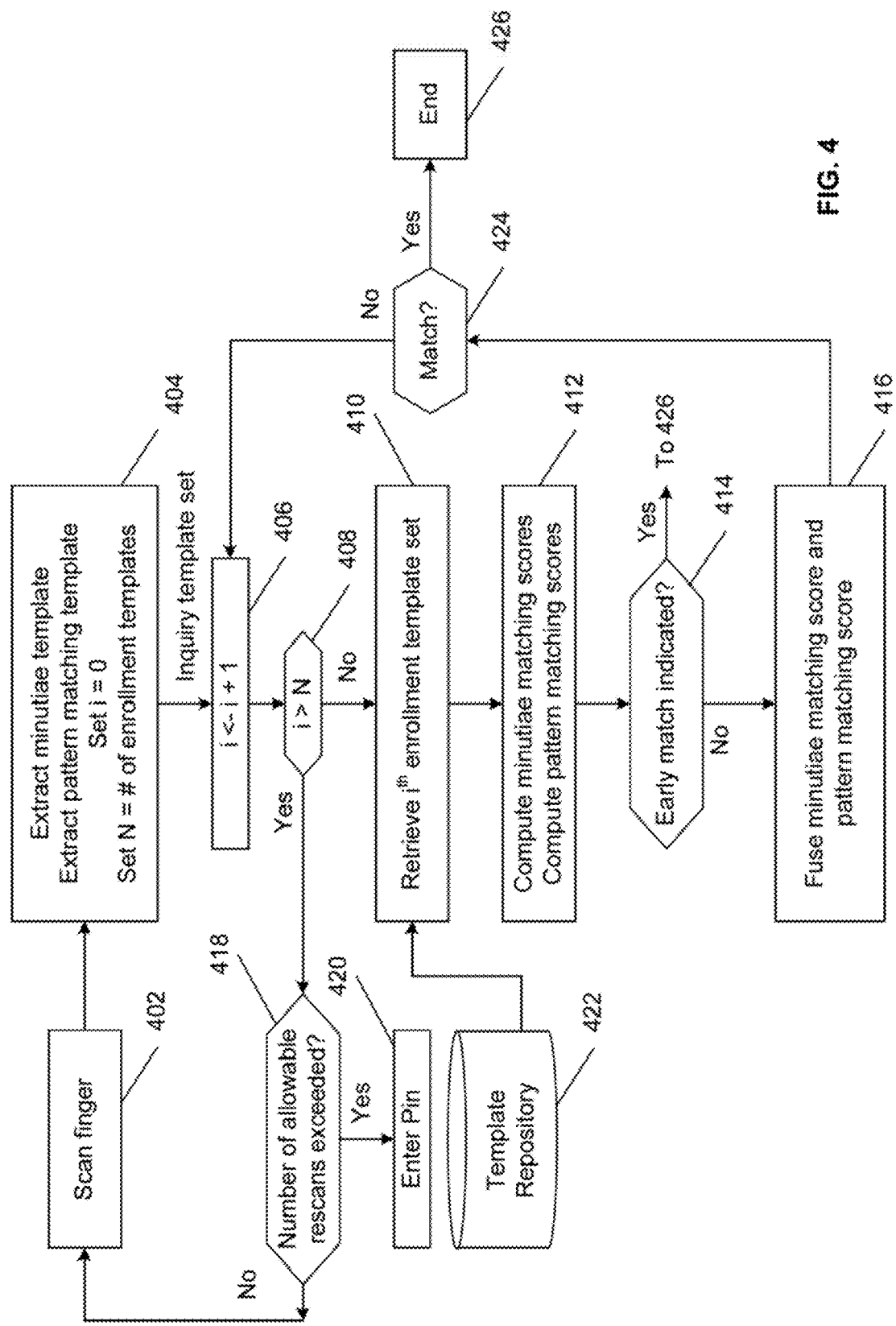
FIG. 4 illustrates an exemplary method of fingerprint verification according to aspects of the present disclosure.

FIG. 4 illustrates an exemplary method of fingerprint verification according to aspects of the present disclosure. In the example shown in FIG. 4, in block 402, the method scans a fingerprint of a user and captures the fingerprint image scanned. In block 404, the method extracts a minutia template and a pattern matching template from the fingerprint image captured. The method then sets a counter (i) to zero and sets the number of templates (N) determined from an enrollment process. In block 406, the method increments the counter (i) by one.

In block 408, the method determines whether the value of counter (i) is larger than the number of templates (N) stored in template repository 422. If the value of counter (i) is larger than the number of templates (408_Yes), the method moves to block 418. Alternatively, if the value of counter (i) is not larger than the number of templates (408_No), the method moves to block 410.

In block 410, the method retrieves the $i^{th}$ enrollment template set from the template repository 422. In block 412, the method computes one or more minutiae matching scores and computes one or more pattern matching scores for the fingerprint image captured. In block 414, the method determines whether an early match can be indicated from the one or more minutiae matching scores or from the one or more pattern matching scores. If an early match is indicated (414_Yes), the method moves to block 426. Otherwise, if there is not an early match (414_No), the method moves to block 416. In block 416, the method fuses the one or more minutiae matching scores and the one or more pattern matching scores.

In block 418, the method determines whether the number of allowable rescans has been exceeded. If the number of allowable rescans has been exceeded (418_Yes), the method moves to block 420. On the other hand, if the number of allowable rescans has not been exceeded (418_No), the method moves to block 402, and the fingerprint is rescanned. According to aspects of the present disclosure, the user may be directed to rotate and/or translate the finger in the rescan in order to get a better fingerprint image. In block 420, the method prompts the user to enter a pin number to complete the user authentication process.

In block 424, the method determines whether there is a match of the fingerprint image captured based on a fused score of the minutiae matching scores and the pattern matching scores. If there is not a match (424_No), the method moves to block 406. Alternatively, if there is a match (424_Yes), the method moves to block 426 and the fingerprint image verification is ended.

Note that the methods of fingerprint verification disclosed in FIG. 3 and FIG. 4 can be configured to perform multiple fingerprint verification simultaneously to increase security and/or lower fingerprint match latency. For example, the disclosed approaches can use fingerprints from multiple fingers to determine a match as a whole or use less than total enrolled fingers and their corresponding fingerprints, out of the total fingerprints enrolled, to obtain a match in less time.

Figure 5B:
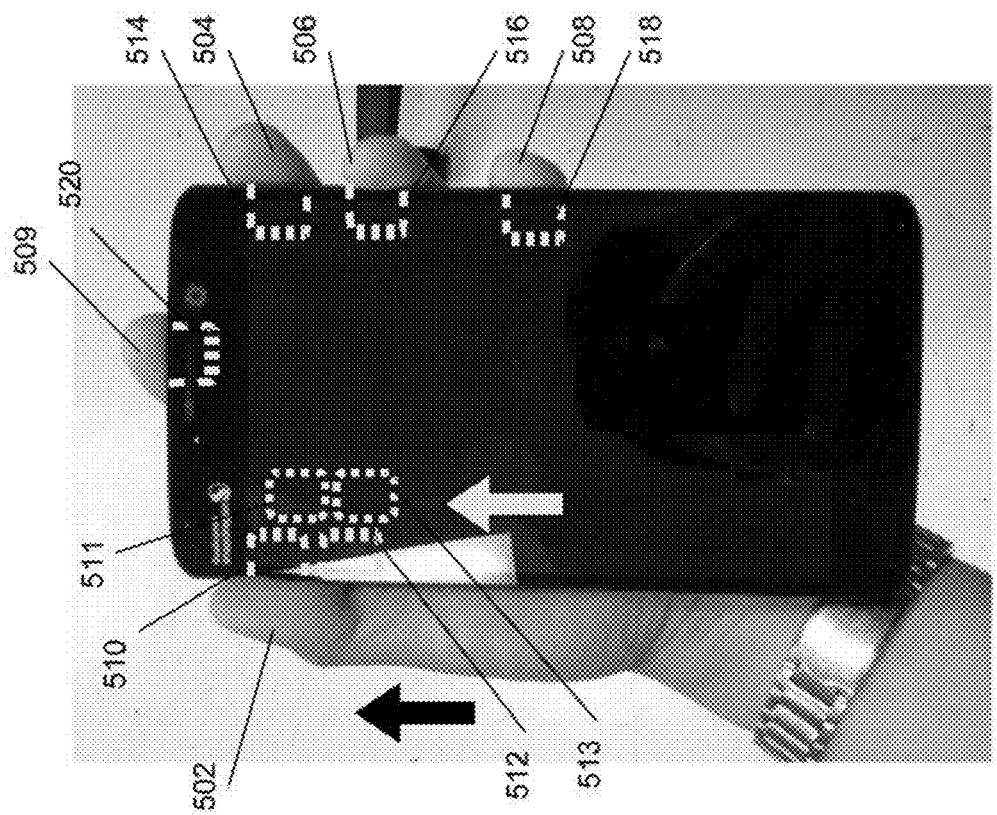
FIGS. 5A-5B illustrate methods of providing virtual buttons in a handheld device according to aspects of the present disclosure.
Figure 5A:
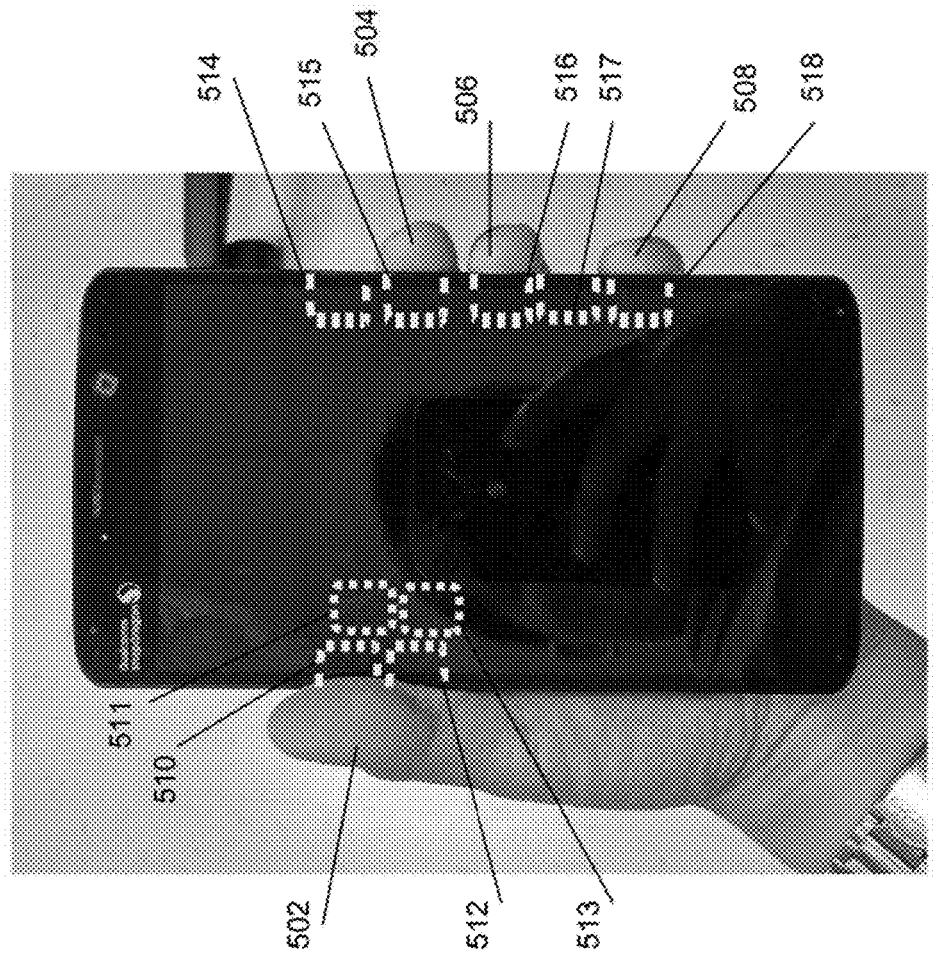

FIGS. 5A-5B illustrate methods of providing virtual buttons in a handheld device according to aspects of the present disclosure. In some embodiments, various ways may be employed to actuate a set of virtual buttons, such as bringing up virtual buttons to the screen, re-arranging/rotating/flipping/re-orienting the virtual buttons, executing commands of the virtual buttons, or any combination thereof. For example, one way to actuate a set of virtual buttons is by detecting a grip of the handheld device and authenticating the user with the fingerprints sensed around the perimeter by the grip of the handheld device. Another way to actuate a set of virtual buttons is by detecting a tap, for example by the user's alternate hand that is not holding the device, relative to approximate a previous location and in conjunction with an orientation of the handheld device. Yet another way to actuate a set of virtual buttons is by rolling a finger as if to press a button in the same location. Yet another way to actuate a set of virtual buttons is by a slider motion along an edge of the handheld device.

In the example shown in FIG. 5A, a first set of virtual buttons (510, 511, 512, and 513) may be provided in the proximity of the thumb 502; virtual buttons 514 and 515 may be provided in the proximity of the long finger 504; virtual buttons 516 and 517 may be provided in the proximity of the ring finger 506; and virtual buttons 518 may be provided in the proximity of the little finger 508. Note that locations of the virtual buttons can be provided in the proximity within reach of the user's fingers along the perimeter of the device; the selection of the virtual buttons may be done based on the application to be performed and based on a history of button usages by the user in substantially similar conditions.

According to aspects of the present disclosure, virtual buttons, such as graphical indicators on a display of the handheld device in the form of a translucent shadow or highlight, may be used to indicate to a user the locations of the virtual buttons relative to an edge of the handheld device. In some applications, a change in orientation or gripping locations of the handheld device can be used to change the set or location of the virtual buttons shown on a display of the device.

In some embodiments, as the holding position of the device may change to a new position, the positions of the virtual buttons may be updated and provided to the user based on the change of fingers holding the device in the new position, and the availability of spaces for displaying the virtual buttons with respect to the new positions of the fingers.

In the example shown in FIG. 5B, as the hand (and fingers) of the user slides upward to the new position, virtual buttons (510, 511, 512, and 513) may be provided that follow the new position of the thumb 502 to slide up along the edge of the device. In addition, virtual button 520 may be provided in the proximity of the index finger 509 in the new position. Virtual buttons 514, 516 and 518 may be provided that follow the new positions of the long finger 504, the ring finger 506, and the little finger 508, respectively as shown in FIG. 5B.

In some implementations, based on the positions of the fingers and availability of spaces with respect to the positions of the fingers in the new position, a new set of virtual buttons may be provided. The new set of virtual button, as shown in FIG. 5B, may include some of the virtual buttons in the previous position of the hand, for example as shown in FIG. 5A. In other implementations, all of the virtual buttons in the previously position of the hand may be provided. In yet other implementations, none of the virtual buttons in the previously position of the hand may be provided. According to aspects of the present disclosure, whether to provide none, some, or all of the virtual buttons from the previous position may be based on past and/or current feedback according to user's preference.

In some implementations, haptic generators may be employed and embedded as part of the ultrasonic sensor array, or implemented discretely from the ultrasonic sensor array within the edges or around perimeters of the handheld device. The haptic generators (not shown) may be configured to generate haptic feedback to indicate positions of one or more virtual buttons to the user. In addition to indicating proximity of virtual button(s) to the corresponding finger(s), the haptic generators may be configured to aid in user experience through general engagement, acknowledgement of selection(s), for example.

Figure 6C:
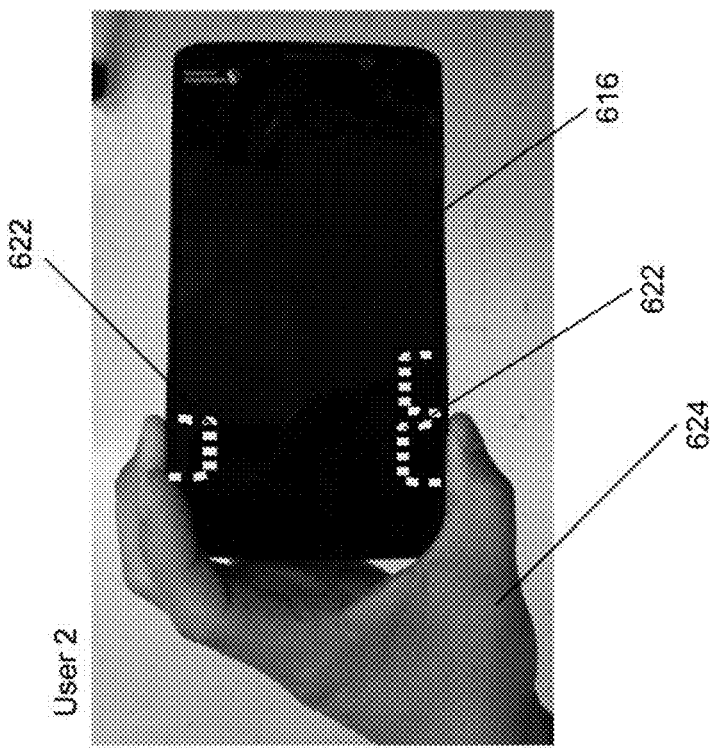
Figure 6B:
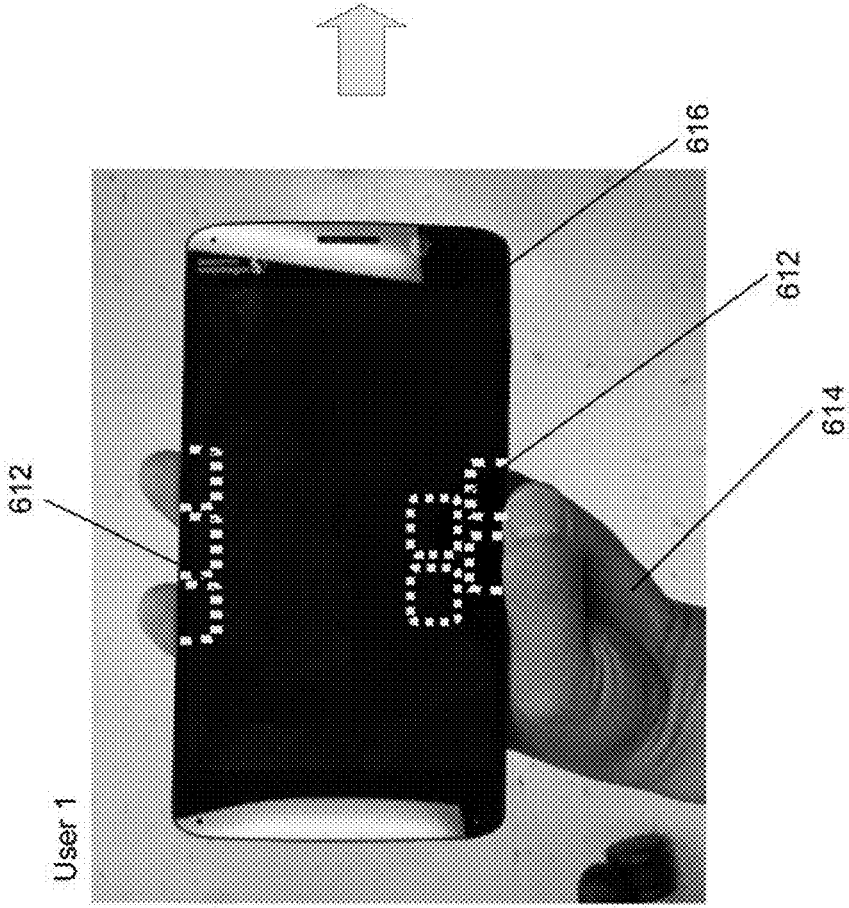

FIGS. 6A-6B illustrate methods of transition of user account settings and providing virtual buttons according to aspects of the present disclosure. Note that account transitions may include, but not limited to transitions from: 1) valid user to valid user; 2) valid user to friendly invalid user; 3) valid user to unfriendly invalid user; 4) or any combination of the above.

In the exemplary flow chart shown in FIG. 6A, in block 602, the method authenticates a first user for using a device. If the first user is an enrolled user, the method moves to block 604. If the first user is not an enrolled user, the method may stay in block 602 until an enrolled user has been verified. In block 604, the method provides settings of the first user for using the device. Settings of the first user may include but not limited to pre-programmed restrictions, application settings, and icon positioning on the display, virtual buttons, application accessibility, or some combinations thereof. In block 606, the method detects the device being held by a second user. In block 608, the method authenticates the second user for using the device. If the second user is a second enrolled user, the method moves to block 610. If the second user is not a second enrolled user, the method may stay in block 608 or move to block 602 until an enrolled user has been verified. Alternatively, the device may enter a locked state to prevent an un-enrolled user from using the device. In block 610, the method provides settings of the second user for using the device. In general, settings of the second user may be different from that of the first user. Similarly, the settings of the second user may include but not limited to pre-programmed restrictions, application settings, and icon positioning on the display, virtual buttons, application accessibility, or some combinations thereof for the second user.

Referring to FIG. 6B, it shows a first set of virtual buttons 612 being provided to a first user 614 of the device 616, assuming the first user has been authenticated to use the device (block 602 of FIG. 6A) and setting of the first user has been provided to the first user (block 604 of FIG. 6A). If the device 616 is shared by two or more members of a team or family, the device 616 may be transferred from a first user to a second user while in an unlocked state, as shown in the illustrations of FIG. 6B and FIG. 6C. Upon detecting the device 616 may be held by a second user 624 (block 606 of FIG. 6A), the second user 624 may be authenticated to determine whether s/he is an enrolled user (block 608 of FIG. 6A). If the second user 624 is an enrolled user, settings of the second user for using the device may be provided (block 610 of FIG. 6A). FIG. 6C shows a second set of virtual buttons 622 being provided to the second user 624 of the device 616.

Figure 7:
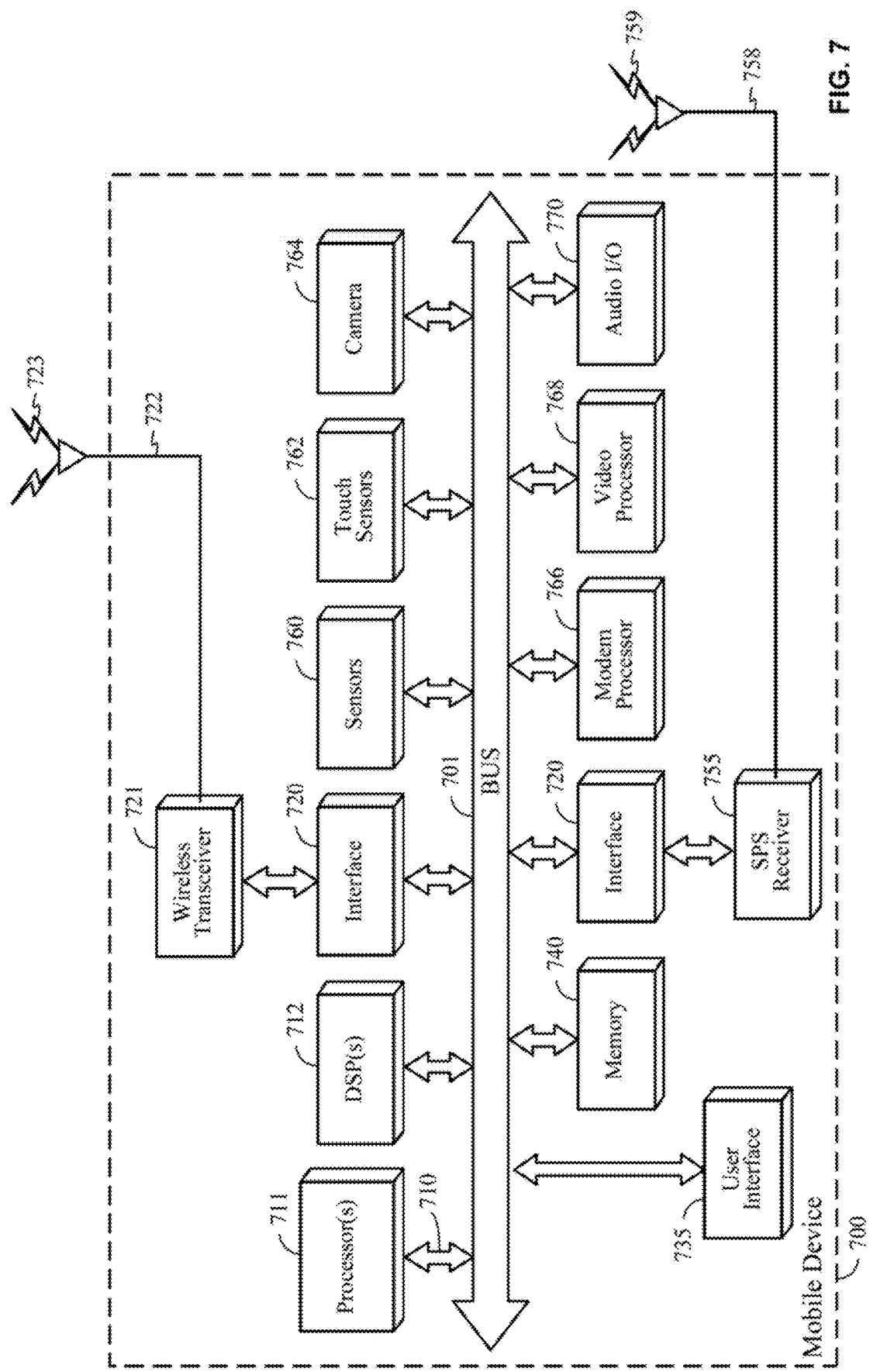
FIG. 7 illustrates an exemplary block diagram of a handheld device that can be configured to implement methods of providing virtual buttons according to aspects of the present disclosure.

FIG. 7 illustrates an exemplary block diagram of a handheld device that can be configured to implement methods of providing virtual buttons according to aspects of the present disclosure. A handheld device may comprise one or more features of mobile device 700 shown in FIG. 7. In certain embodiments, mobile device 700 may also comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

Mobile device 700 may also comprise SPS receiver 755 capable of receiving and acquiring SPS signals 759 via SPS antenna 758. SPS receiver 755 may also process, in whole or in part, acquired SPS signals 759 for estimating a location of a mobile device. In some embodiments, processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless STA as discussed above. Processor(s) 711 and/or DSP(s) 712 may execute instructions to execute one or more aspects of processes/methods discussed below in connection with FIG. 8. Processor(s) 711 and/or DSP(s) 712 may perform the methods and/or functions as described in FIG. 1A-1B through FIG. 6A-6C and FIG. 8A-8D.

Also shown in FIG. 7, a user interface 735 may comprise any one of several devices such as, for example, a speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DSP(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

FIG. 8A illustrates an exemplary flow chart for implementing methods of providing virtual buttons in a handheld device according to aspects of the present disclosure. In block 802, the method detects a grip around a perimeter of a device, where the perimeter of the device includes one or more ultrasonic sensors. In block 804, the method determines one or more locations of one or more fingers of a user using data collected by the one or more ultrasonic sensors. In block 806, the method providing one or more virtual buttons around the perimeter of the device based on the one or more locations of the one or more fingers of the user.

According to aspects of the present disclosure, the method of providing virtual buttons in a handheld device may further or optionally include the methods performed in block 808. In block 808, the method detects the device being held by a second user, in an unlocked state of the device, determines whether the second user is a second enrolled user using fingerprint images collected by the one or more ultrasonic sensors, and provides a second set of virtual buttons corresponding to settings of the second user in response to a determination of the second user being the second enrolled user.

FIG. 8B illustrates an exemplary flow chart for implementing methods of authenticating a user according to aspects of the present disclosure. In block 812, the method determines whether the user is an enrolled user using fingerprint images collected by the one or more ultrasonic sensors, and unlocks the device in response to a determination of the user being the enrolled user. In block 814, the method continuously monitors subsequent operations of the device are being performed by the enrolled user, and terminates an application program or holds the application program in an unresponsive state in response to a determination that the subsequent operations of the device are not being performed by the enrolled user.

FIG. 8C illustrates another exemplary flow chart for implementing methods of providing virtual buttons in a handheld device according to aspects of the present disclosure. In block 822, the method positions the one or more virtual buttons based upon the one or more locations of the one or more fingers of the user.

In block 824, the method tracks movements of the one or more fingers along the perimeter of the device, and repositions the one or more virtual buttons dynamically in response to the movements of the one or more fingers.

In block 826, the method detects changes in orientation of the device and changes in the locations of the one or more fingers, and repositions the one or more virtual buttons dynamically with respect to the changes in orientation of the device and changes in the locations of the one or more fingers.

In block 828, the method provides a set of predicted virtual buttons based on a history of user executions stored by the device.

FIG. 8D illustrates an exemplary flow chart for implementing applications of providing virtual buttons in a handheld device according to aspects of the present disclosure. In block 832, the method detects a pressure applied to the one or more virtual buttons by a user, and executes a command corresponding to the pressure applied to the one or more virtual buttons. In block 834, the command corresponding to the pressure applied to the one or more virtual buttons by the user is dependent upon a determination of which finger is applying the pressure. Note that the command corresponding to the pressure applied to the one or more virtual buttons by the user may be performed without the user looking at the one or more virtual buttons and may be performed with one hand.

Figure 9B:
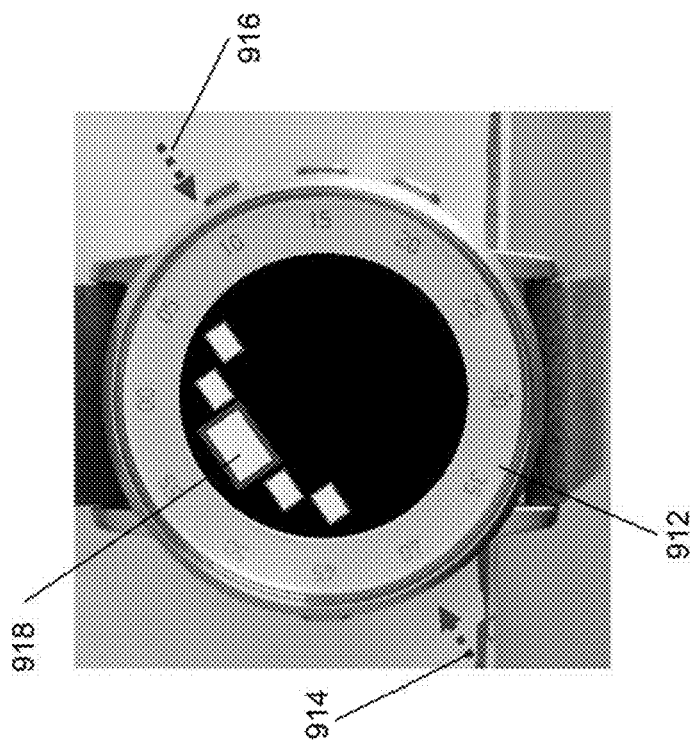
FIGS. 9A-9J illustrate methods of controlling virtual buttons in a handheld device according to aspects of the present disclosure.
Figure 9A:
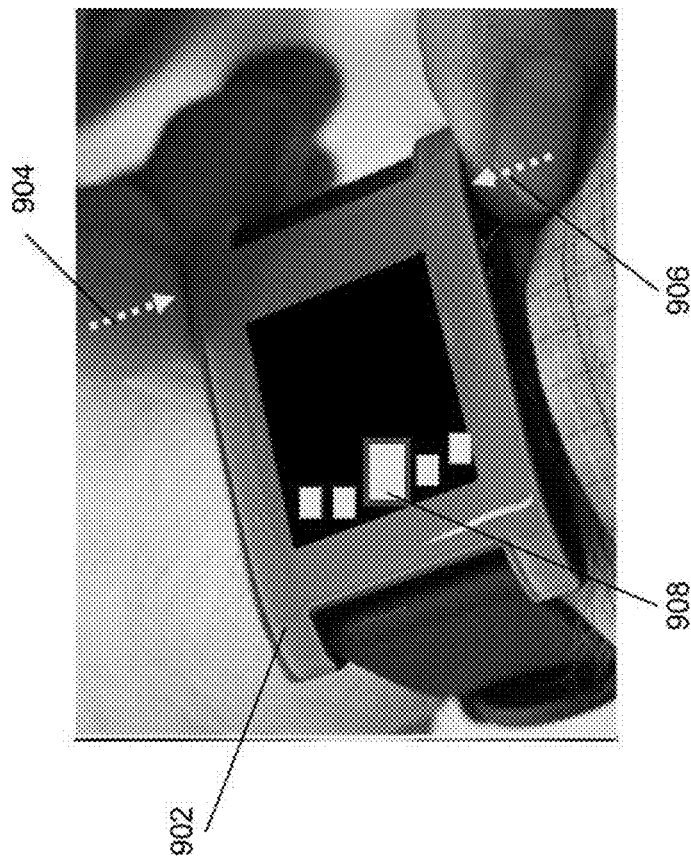

FIGS. 9A-9B illustrate exemplary implementations of selecting a virtual button according to aspects of the present disclosure. In the example shown in FIG. 9A, device 902 being squeezed by opposing fingers, indicated by dotted arrows 904 and 906, can be interpreted as a grip to select a virtual button 908. In this example, the form factor of the device 902 may be rectangular, and the orientation of the virtual button 908 may be adjusted based on locations of the grip.

In another implementation as shown in FIG. 9B, device 912 being squeezed by opposing fingers, indicated by dotted arrows 914 and 916, can be interpreted as a grip to select a virtual button 918. In this example, the form factor of the device 912 may be circular, and the orientation of the virtual button 918 may be adjusted based on locations of the grip.

Figure 9D:
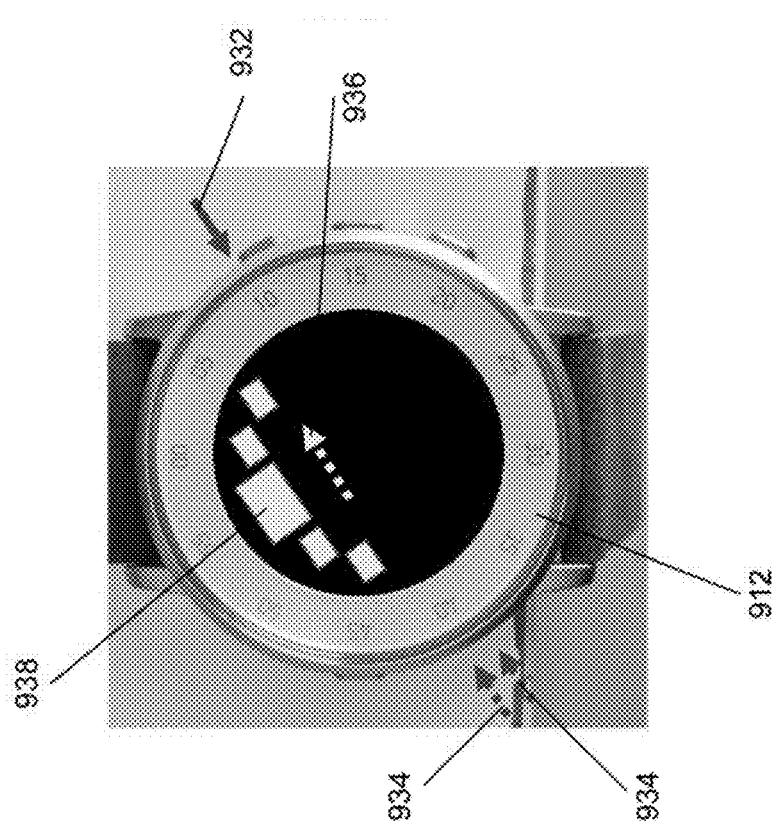
Figure 9C:
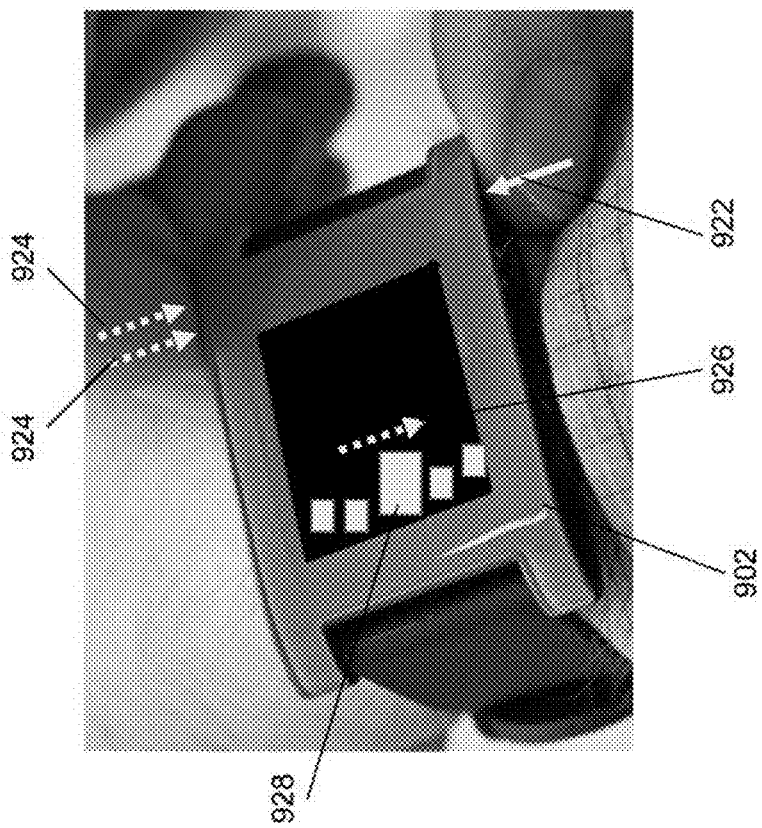

FIGS. 9C-9D illustrate exemplary implementations of shifting or sliding a virtual button according to aspects of the present disclosure. In the example shown in FIG. 9C, holding one finger (indicated by arrow 922) and double tapping with another finger on the opposing side (indicated by dotted arrows 924) can be interpreted as a way to shift a set of virtual buttons 928, where the shift/slide indicated by arrow 926 in the middle of the screen. In this example, the form factor of the device 902 may be rectangular, and the orientation of the virtual button 928 may be adjusted based on locations of the grip or angle of the device 902 measured by other sensors. In some implementations, virtual buttons can be the same size or become larger and focused as an indicator that the virtual button is being selected.

In another implementation as shown in FIG. 9D, holding one finger (indicated by arrow 932) and double tapping with another finger on the opposing side (indicated by dotted arrows 934) can be interpreted as a way to shift a set of virtual buttons 938, where the shift/slide is indicated by arrow 936 in the middle of the screen. In this example, the form factor of the device 912 may be circular, and the orientation of the virtual button 938 may be adjusted based on locations of the grip or angle of the device 912 measured by other sensors.

Figure 9F:
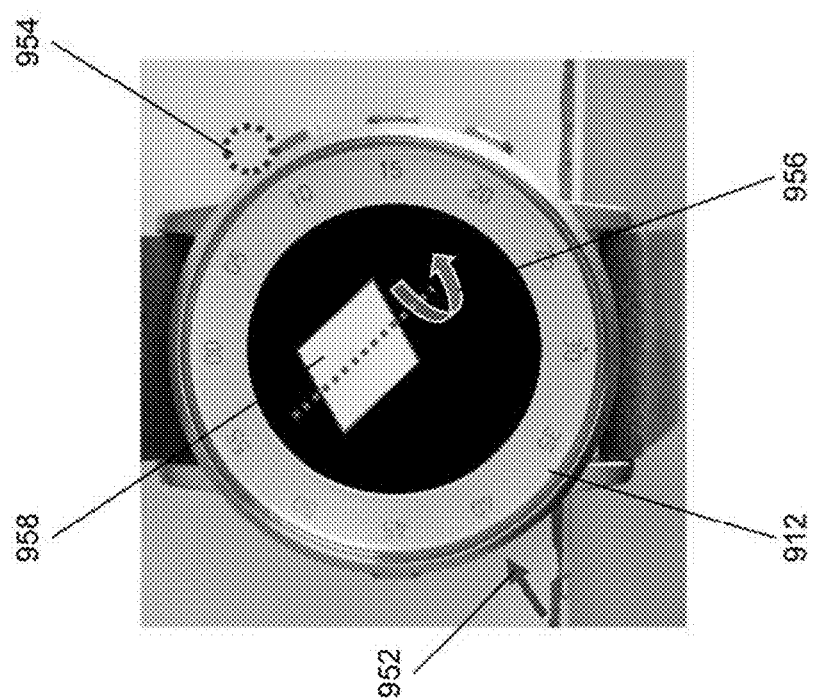
Figure 9E:
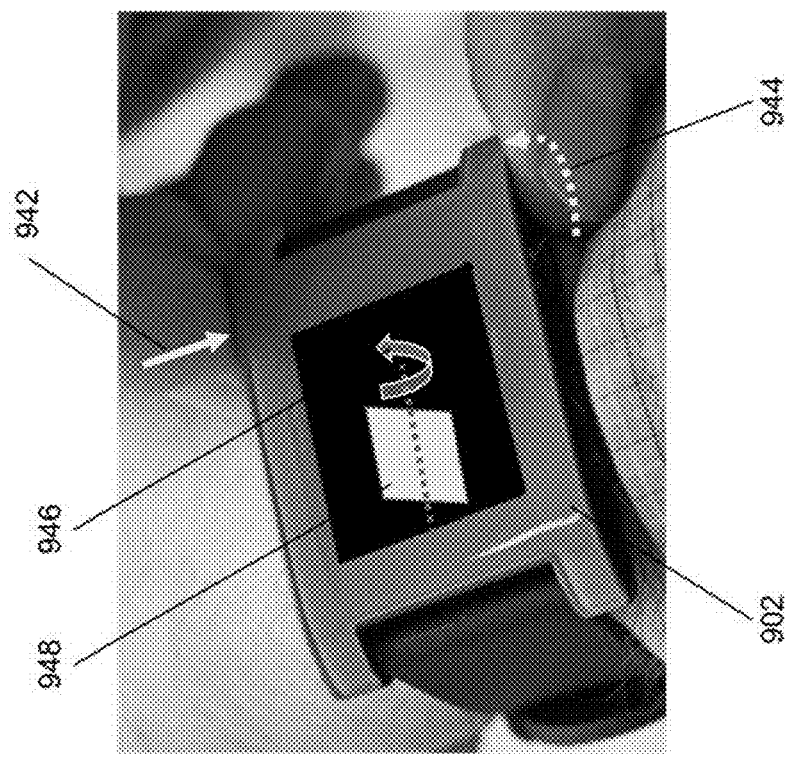

FIGS. 9E-9F illustrate exemplary implementations of flipping a virtual button to an alternative virtual button according to aspects of the present disclosure. In the example shown in FIG. 9E, holding one finger (indicated by arrow 942) and vertically sliding with another finger (indicated by dotted arrow 944) on the opposing side can be interpreted as a way to flip a virtual button 948 to an alternate virtual button or view of the same virtual entity. In this example, the form factor of the device 902 may be rectangular, and the orientation of the virtual button 948 may be adjusted based on locations of the grip or angle of the device 902 measured by other sensors. The flipping of virtual button 948 may be indicated by arrow 946.

In another implementation as shown in FIG. 9F, holding one finger (indicated by arrow 952) and making a circular motion with another finger (indicated by dotted arrow 954) on the opposing side can be interpreted as a way to flip a virtual button 958 to an alternate virtual button or view of the same virtual entity. In this example, the form factor of the device 912 may be circular, and the orientation of the virtual button 958 may be adjusted based on locations of the grip or angle of the device 912 measured by other sensors. The flipping of virtual button 958 may be indicated by arrow 956.

Figure 9H:
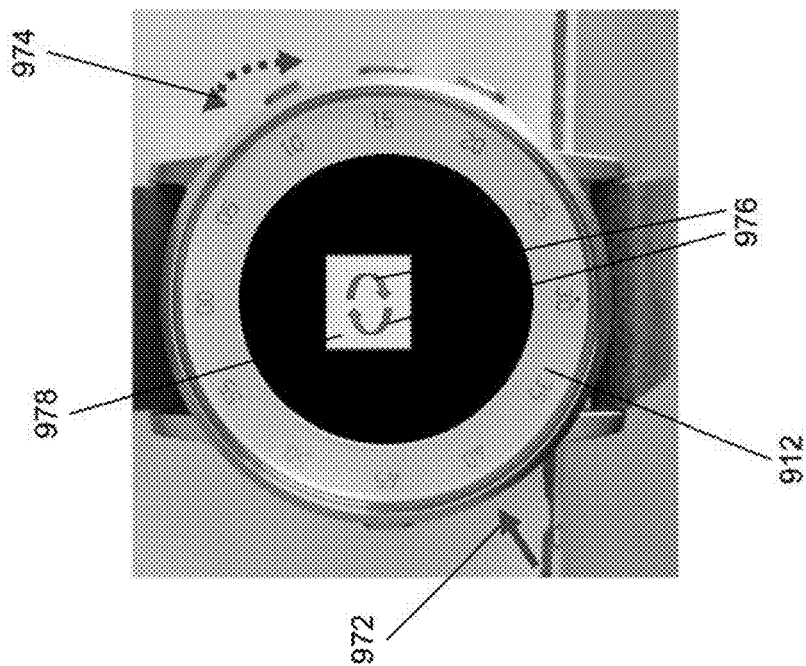
Figure 9G:
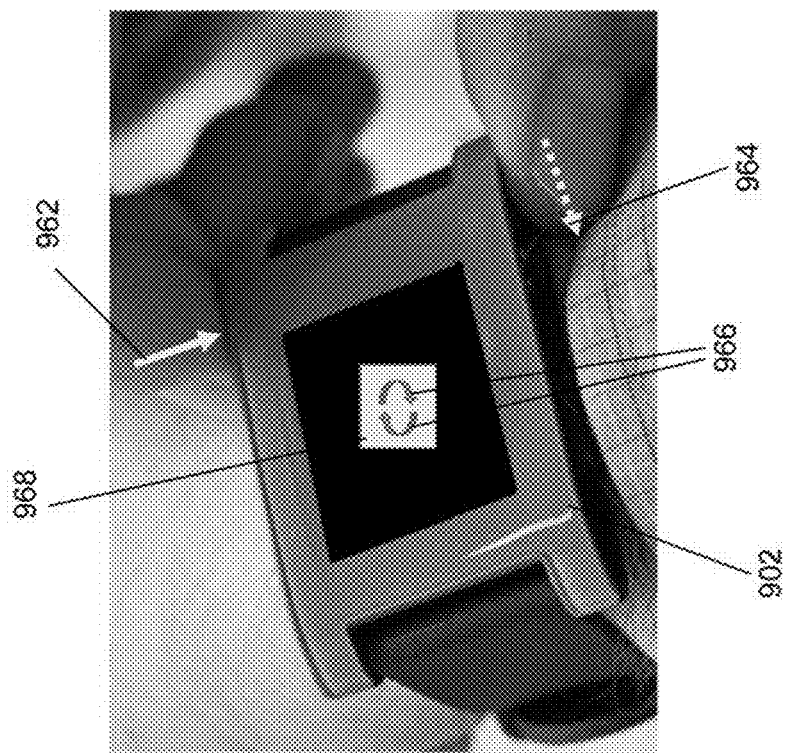

FIGS. 9G-9H illustrate exemplary implementations of rotating a virtual button according to aspects of the present disclosure. In the example shown in FIG. 9G, holding one finger (indicated by arrow 962) and horizontally sliding with another finger (indicated by arrow 964) on the opposing side of device 902 (or sliding both in alternative directions) can be interpreted as a way to rotate a virtual button 968 to an alternate view (not shown). For example, the method of rotating a virtual button may be used to set a graphical analog clock, etc. In this example, the form factor of the device 902 may be rectangular, and the orientation of the virtual button 968 may be adjusted based on locations of the grip or angle of the device 902 measured by other sensors. The rotation of virtual button 968 may be indicated by arrows 966.

In another implementation as shown in FIG. 9H, holding one finger (indicated by arrow 972) and sliding with another finger (indicated by arrow 974) on the opposing side of device 902 (or sliding both in alternative directions) can be interpreted as a way to rotate a virtual button 978 to an alternate view (not shown). For example, the method of rotating a virtual button may be used to set a graphical analog clock, etc. In this example, the form factor of the device 912 may be circular, and the orientation of the virtual button 978 may be adjusted based on locations of the grip or angle of the device 912 measured by other sensors. The rotation of virtual button 978 may be indicated by arrows 976.

Figure 9J:
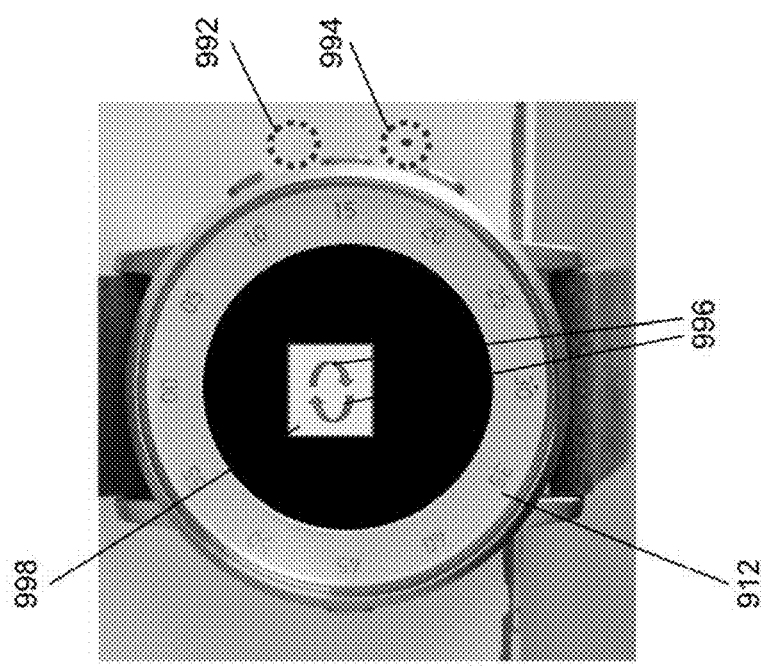
Figure 9I:
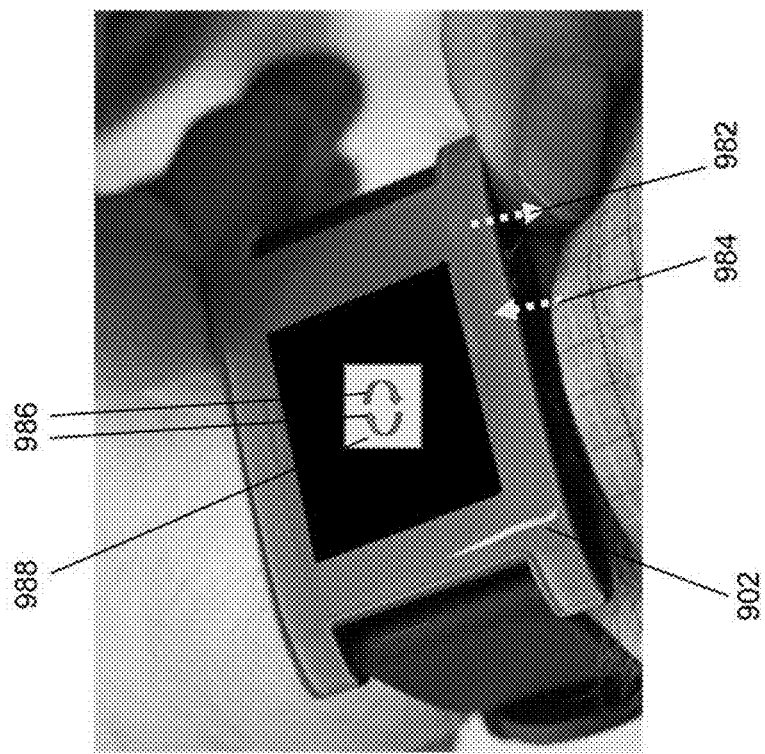

FIGS. 9I-9J illustrate exemplary implementations of a virtual dial for controlling virtual buttons according to aspects of the present disclosure. In the example shown in FIG. 9I, the side of device 902 may be gripped with two finger tips (indicated by arrows 982 and 984) as if to spin a dial. The finger tips may sweep in alternative vertical directions to convey a rotation (indicated by arrows 986) of a virtual dial 988. Note that the control of a virtual dial may be implemented on any surface where a fingerprint sensor is located.

In another implementation as shown in FIG. 9J, the side of device 912 may be gripped with two finger tips (indicated by dotted circles 992 and 994) as if to spin a dial. The finger tips may sweep in alternative vertical directions to convey a rotation (indicated by arrows 996) of a virtual dial 998.

Note that the illustrations shown in FIGS. 9A-9J are some examples of virtual button manipulations. They are not meant to be a comprehensive list of possible grips. Depending on the device design by the manufacturer, particular grips may be coupled with other differing virtual button behavior that may not be shown in the illustrations. A particular grip may perform different virtual button behaviors depending on user experience in one context or another of the user interface. If a larger form factor such as a smartphone is used, where both hands are available, combinations of the illustrated grips may be used simultaneously.

Note that at least the following three paragraphs, FIG. 3, FIG. 4, FIG. 6A, FIG. 7, FIG. 8A-8D, FIG. 9A-9J and their corresponding descriptions provide means for detecting a grip around a perimeter of the device, where the perimeter of the device includes one or more ultrasonic sensors; means for determining one or more locations of one or more fingers of a user using data collected by the one or more ultrasonic sensors; means for providing one or more virtual buttons around the perimeter of the device based on the one or more locations of the one or more fingers of the user; means for positioning the one or more virtual buttons based upon the one or more locations of the one or more fingers of the user; means for tracking movements of the one or more fingers along the perimeter of the device; and means for repositioning the one or more virtual buttons dynamically in response to the movements of the one or more fingers.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT.

GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

I claim:

1. A method of providing virtual buttons in a device, comprising:
   detecting a grip around a perimeter of the device, wherein the perimeter of the device includes one or more ultrasonic sensors;
   determining one or more locations of one or more fingers, respectively, of a user using data collected by the one or more ultrasonic sensors;
   providing one or more virtual buttons on a display screen of the device;
   tracking a sliding movement of the one or more fingers along the perimeter of the device using the one or more ultrasonic sensors; and
   repositioning the one or more virtual buttons by rotating or flipping the one or more virtual buttons dynamically in response to the sliding movement of the one or more fingers.

2. The method of claim 1, wherein determining the one or more locations of the one or more fingers of the user comprises:
   determining a thumb location of the user;
   determining an index finger location of the user;
   determining a long finger location of the user;
   determining a ring finger location of the user;
   determining a little finger location of the user;
   or some combination thereof.

3. The method of claim 1, wherein providing the one or more virtual buttons comprises:
   positioning the one or more virtual buttons based upon the one or more locations of the one or more fingers of the user.

4. The method of claim 3, wherein providing the one or more virtual buttons further comprises:
   detecting changes in orientation of the device and changes in the locations of the one or more fingers; and
   repositioning the one or more virtual buttons dynamically with respect to the changes in orientation of the device and changes in the locations of the one or more fingers.

5. The method of claim 3, wherein providing the one or more virtual buttons further comprises:
   providing a set of predicted virtual buttons based on a history of user executions stored by the device.

6. The method of claim 3, further comprising:
   indicating positions of the one or more virtual buttons to the user through corresponding one or more haptic feedbacks; and
   acknowledging selections of the one or more virtual buttons to the user through the corresponding one or more haptic feedbacks.

7. The method of claim 1, further comprising:
   detecting a pressure applied to the one or more virtual buttons by the user; and
   executing a command corresponding to the pressure applied to the one or more virtual buttons.

8. The method of claim 7, wherein the command corresponding to the pressure applied to the one or more virtual buttons by the user is dependent upon a determination of which finger is applying the pressure.

9. The method of claim 1, further comprising:
detecting the device being held by a second user, in an unlocked state of the device;
determining whether the second user is a second enrolled user using fingerprint images collected by the one or more ultrasonic sensors; and
providing a second set of virtual buttons corresponding to settings of the second user in response to a determination of the second user being the second enrolled user.

10. The method of claim 1, wherein detecting the grip around the perimeter of the device comprises:
determining whether the user is an enrolled user using fingerprint images collected by the one or more ultrasonic sensors; and
unlocking the device in response to a determination of the user being the enrolled user.

11. The method of claim 10, further comprising:
continuously monitoring subsequent operations of the device are being performed by the enrolled user; and
terminating an application program, or hold the application program in an unresponsive state in response to a determination that the subsequent operations of the device are not being performed by the enrolled user.

12. The method of claim 1, wherein tracking the sliding movement of the one or more fingers comprises tracking one or more fingers sliding linearly or rotationally along the perimeter of the device.

13. A device configured to provide virtual buttons, comprising:
one or more ultrasonic sensors configured to detect a grip around a perimeter of the device; and
one or more processors configured to:
determine one or more locations of one or more fingers, respectively, of a user using data collected by the one or more ultrasonic sensors;
provide one or more virtual buttons on a display screen of the device;
track a sliding movement of the one or more fingers along the perimeter of the device; using the one or more ultrasonic sensors; and
reposition the one or more virtual buttons by rotating or flipping the one or more virtual buttons dynamically in response to the sliding movement of the one or more fingers.

14. The device of claim 13, wherein the one or more processors are further configured to:
determine a thumb location of the user;
determine an index finger location of the user;
determine a long finger location of the user;
determine a ring finger location of the user;
determine a little finger location of the user;
or some combination thereof.

15. The device of claim 13, wherein the one or more processors are further configured to:
position the one or more virtual buttons based upon the one or more locations of the one or more fingers of the user.

16. The device of claim 15, wherein the one or more processors are further configured to:
detect changes in orientation of the device and changes in the locations of the one or more fingers; and
reposition the one or more virtual buttons dynamically with respect to the changes in orientation of the device and changes in the locations of the one or more fingers.

17. The device of claim 15, wherein the one or more processors are further configured to:
provide a set of predicted virtual buttons based on an history of user executions stored by the device.

18. The device of claim 15, wherein the one or more processors are further configured to:
indicate positions of the one or more virtual buttons to the user through corresponding one or more haptic feedbacks; and
acknowledge selections of the one or more virtual buttons to the user through the corresponding one or more haptic feedbacks.

19. The device of claim 18, wherein the command corresponding to the pressure applied to the one or more virtual buttons by the user is dependent upon a determination of which finger is applying the pressure.

20. The device of claim 13, wherein the one or more processors are further configured to:
detect a pressure applied to the one or more virtual buttons by the user; and
execute a command corresponding to the pressure applied to the one or more virtual buttons.

21. The device of claim 13, wherein the one or more processors are further configured to:
detect the device being held by a second user, in an unlocked state of the device;
determine whether the second user is a second enrolled user using fingerprint images collected by the one or more ultrasonic sensors; and
provide a second set of virtual buttons corresponding to settings of the second user in response to a determination of the second user being the second enrolled user.

22. The device of claim 13, wherein the one or more processors are further configured to:
determine whether the user is an enrolled user using fingerprint images collected by the one or more ultrasonic sensors; and
unlock the device in response to a determination of the user being the enrolled user.

23. The device of claim 22, the one or more processors are further configured to:
continuously monitor subsequent operations of the device are being performed by the enrolled user; and
terminate an application program, or hold the application program in an unresponsive state in response to a determination that the subsequent operations of the device are not being performed by the enrolled user.

24. The method of claim 13, wherein the one or more processors are configured to track the sliding movement of the one or more fingers by being configured to track one or more fingers sliding linearly or rotationally along the perimeter of the device.

25. A device for providing virtual buttons, comprising:
means for detecting a grip around a perimeter of the device, wherein the perimeter of the device includes one or more ultrasonic sensors;
means for determining one or more locations of one or more fingers of a user, respectively, using data collected by the one or more ultrasonic sensors;
means for providing one or more virtual buttons on a display screen of the device;
means for tracking a sliding movement of the one or more fingers along the perimeter of the device using the one or more ultrasonic sensors; and means for repositioning the one or more virtual buttons by rotating or flipping the one or more virtual buttons dynamically in response to the sliding movement of the one or more fingers.

26. The device of claim 25, wherein the means for providing the one or more virtual buttons comprises:
   means for positioning the one or more virtual buttons based upon the one or more locations of the one or more fingers of the user.

27. A non-transitory computer-readable storage medium including instructions stored thereon that, when executed, cause a device to provide virtual buttons, comprising instruction configured to:
   detect a grip around a perimeter of the device, wherein the perimeter of the device includes one or more ultrasonic sensors;
   determine one or more locations of one or more fingers of a user using data collected by the one or more ultrasonic sensors;
   provide one or more virtual buttons on a display screen of the device;
   track a sliding movement of the one or more fingers along the perimeter of the device using the one or more ultrasonic sensors; and
   reposition the one or more virtual buttons by rotating or flipping the one or more virtual buttons dynamically in response to the sliding movement of the one or more fingers.

28. The non-transitory computer-readable storage medium of claim 27, wherein the instruction is further configured to:
   position the one or more virtual buttons based upon the one or more locations of the one or more fingers of the user.

29. The non-transitory computer-readable storage medium of claim 28, wherein the instruction is further configured to:
   track movements of the one or more fingers along the perimeter of the device; and
   reposition the one or more virtual buttons dynamically in response to the movements of the one or more fingers.

* * * * *